United States Patent
Yoon et al.

(10) Patent No.: US 9,167,608 B2
(45) Date of Patent: *Oct. 20, 2015

(54) ACCESS POINT AND METHOD FOR CONNECTING WIRELESS COMMUNICATION

(71) Applicant: SAMSUNG ELECTRONICS CO., LTD., Suwon-si (KR)

(72) Inventors: Hyun-jin Yoon, Suwon-si (KR);
Eung-sik Yoon, Suwon-si (KR);
Cheon-seong Lee, Suwon-si (KR);
Tae-don Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,805

(22) Filed: Jun. 25, 2014

(65) Prior Publication Data

US 2014/0307725 A1 Oct. 16, 2014

Related U.S. Application Data

(63) Continuation of application No. 13/183,851, filed on Jul. 15, 2011, now Pat. No. 8,787,222.

(60) Provisional application No. 61/364,959, filed on Jul. 16, 2010.

(30) Foreign Application Priority Data

May 2, 2011 (KR) ........................ 10-2011-0041699

(51) Int. Cl.
*H04W 76/02* (2009.01)
*H04L 12/26* (2006.01)
(Continued)

(52) U.S. Cl.
CPC ........... *H04W 76/02* (2013.01); *H04L 43/0811* (2013.01); *H04L 63/18* (2013.01); *H04L 63/20* (2013.01); *H04W 8/005* (2013.01); *H04W 12/04* (2013.01); *H04W 48/16* (2013.01)

(58) Field of Classification Search
None
See application file for complete search history.

(56) References Cited

U.S. PATENT DOCUMENTS 6,782,260 B2 8/2004 Nakakita et al.
7,324,805 B2 1/2008 Nakakita et al.
(Continued)

FOREIGN PATENT DOCUMENTS

EP 1701478 A1 9/2006
EP 2134112 A1 12/2009
(Continued)

OTHER PUBLICATIONS

Cisco Aironet 1300 Datasheet, 2005, Cisco Systems Inc.*
(Continued)

*Primary Examiner* — Marcus R Smith
*Assistant Examiner* — Omeed D Rahgozar
(74) *Attorney, Agent, or Firm* — Sughrue Mion, PLLC

(57) ABSTRACT

An access point and a method for connecting wireless communication thereof are provided. The method includes, if a connecting device is connected to the access point, registering information of the connecting device, if the connecting device transmits a first signal in response to a beacon message of the access point after having been disconnected from the access point and connected to a host device, determining whether the connecting device is already registered using the first signal, and, if it is determined that the connecting device is already registered, connecting to the host device via the wireless communication connection.

20 Claims, 6 Drawing Sheets

(51) Int. Cl.
 *H04L 29/06* (2006.01)
 *H04W 8/00* (2009.01)
 *H04W 12/04* (2009.01)
 *H04W 48/16* (2009.01)

(56) References Cited

U.S. PATENT DOCUMENTS

| | | | |
|---|---|---|---|
| 7,986,642 B2 | 7/2011 | Ishimoto | |
| 8,077,684 B2* | 12/2011 | Tchigevsky | 370/338 |
| 2002/0061748 A1 | 5/2002 | Nakakita et al. | |
| 2005/0014503 A1 | 1/2005 | Nakakita et al. | |
| 2008/0159242 A1* | 7/2008 | Rayzman et al. | 370/338 |
| 2008/0189390 A1* | 8/2008 | Heller et al. | 709/218 |
| 2008/0240068 A1 | 10/2008 | Ishimoto | |
| 2013/0094386 A1* | 4/2013 | Kawamura | 370/252 |

FOREIGN PATENT DOCUMENTS

| | | |
|---|---|---|
| JP | 2002159053 A | 5/2002 |
| JP | 2003110570 A | 4/2003 |
| JP | 2005184314 A | 7/2005 |
| JP | 200753703 A | 3/2007 |
| JP | 2008193597 A | 8/2008 |
| JP | 2008252787 A | 10/2008 |
| JP | 2009231971 A | 10/2009 |
| JP | 2009260557 A | 11/2009 |
| WO | 2008059206 A2 | 5/2008 |

OTHER PUBLICATIONS

Cisco Aironet 1300 Manual, 2005, Cisco Systems Inc.*
EP1701478—Machine Translation.*
Communication dated Dec. 5, 2011 from the European Patent Office in counterpart European application No. 11174165.8.
"OPEN824RLW Router: Securing Your Wireless Connection." OPEN Networks Pty. Ltd., May 19, 2006.
Cisco Aironet 1300 Datasheet, 2005, Cisco Systems, Inc.
Cicsco Aironet 1300 Manual, 2005, Cisco Systems, Inc.
Communication dated Feb. 24, 2015, issued by the Japanese Intellectual Property Office in counterpart Japanese Application No. 2011-156954.

* cited by examiner

ACCESS POINT AND METHOD FOR CONNECTING WIRELESS COMMUNICATION

CROSS-REFERENCE TO RELATED APPLICATIONS

This application is a continuation application of U.S. patent application Ser. No. 13/183,851, filed Jul. 15, 2011, which claims priority from U.S. Provisional Application No. 61/364,959, filed on Jul. 16, 2010 in the United States Patent and Trademark Office, and Korean Patent Application No. 10-2011-0041699, filed on May 2, 2011 in the Korean Intellectual Property Office, the disclosures of which are incorporated herein by reference in their entirety.

BACKGROUND

1. Field

Methods and apparatuses consistent with exemplary embodiments relate to an access point and a method for connecting wireless communication thereof, and more particularly, to an access point which can provide wireless communication connection to an external host device and a method for connecting wireless communication thereof.

2. Description of the Related Art

In a related-art Wi-Fi wireless communication connecting method, if a wireless local area network (LAN) function of a terminal starts to be operated, the terminal searches for an access point (AP) existing nearby. If a plurality of APs are searched for, the terminal selects an AP to be connected. Then, the terminal performs encryption setting of wireless communication. The terminal completes the setting by going through a process such as wireless connection verification.

However, such a related-art method requires a user to input a password to connect wireless communication every time that connection is needed. Therefore, the Wi-Fi alliance prescribes Wi-Fi protected setup (WPS) of various methods so that wireless connection can be established more conveniently. For example, wireless communication is connected between the terminal and the AP using a push button configuration (PBC) method, a personal identification number (PIN) method, or a method using a USB memory.

However, since the PBC method can achieve the wireless communication connection only if buttons on the AP and the terminal are pressed, the PBC method may cause inconvenience when a user finds the buttons and also requires a user to wait for the connection as long as 120 seconds. Also, the PIN method requires a cumbersome and complicated process of manually inputting an 8-digit password generated in the AP. Also, the USB method does not precisely prescribe a standard method and also requires a separate USB memory besides the AP and the terminal.

Therefore, there is a demand for establishing such wireless communications more conveniently and more intuitively.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a method of operating an access point, which is connectable to a host device via a wireless communication connection, and further connectable to a connecting device, the method including: if the connecting device is connected to the access point, registering information of the connecting device by the access point; if the connecting device transmits a first signal in response to a first beacon message of the access point after having been disconnected from the access point and connected to the host device, receiving the first signal by the access point; determining whether the connecting device is already registered using the first signal; and if the connecting device is already registered, connecting to the host device via the wireless communication connection.

The registering information of the connecting device by the access point may include: if the connecting device is connected to the access point, identifying manufacturer information of the connecting device and determining whether the connecting device is of a specific manufacturer; and if the connecting device is of the specific manufacturer, registering media access control (MAC) address information of the connecting device.

The registering information of the connecting device by the access point may further include, if the MAC address information of the connecting device is registered, outputting a connecting device registration completion display.

The first signal may include at least one of manufacturer information of the connecting device, personal information number (PIN) information and media access control (MAC) address information of the connecting device.

The first signal may include the manufacturer information, the PIN information and the MAC address information, the determining whether the connecting device is already registered may include: determining whether the manufacture information of the connecting device comprises information of a specific manufacturer, determining whether the first signal comprises the PIN information, and determining whether the MAC address information of the connecting device corresponds to the registered MAC address information.

The connecting to the host device via the wireless communication connection may include: if the connecting device is already registered, adding success information, wherein the success information indicates that the wireless communication connection has succeeded, to a second signal, and wherein the second signal is a response signal for the first signal, and transmitting the second signal to the connecting device; and establishing the wireless communication connection using the PIN information.

The method may further include, if another connecting device which is not registered at the access point is connected to the host device and transmits a response signal in response to a second beacon message of the access point, transmitting a wireless connection failure signal to the other connecting device.

The connecting device may be a Universal Serial Bus (USB) dongle.

According to an aspect of another exemplary embodiment, there is provided an access point including: a connecting unit which is connectable to a connecting device; a storage unit which registers information of the connecting device, if the connecting device is connected to the connecting unit; a communication unit which broadcasts a first beacon message; and a controller wherein, if a first signal is received from the connecting device in response to the broadcast first beacon message after the connecting device has been disconnected from the access point and connected to a host device, the controller determines whether the connecting device is already registered at the storage unit according to the first signal, and connects to the host device via a wireless communication connection.

If the connecting device is connected to the access point, the controller may identify manufacturer information of the connecting device and determine whether the connecting device is of a specific manufacturer, and, if the connecting device is of the specific manufacturer, the controller may store media access control (MAC) address information of the connecting device in the storage unit.

The access point may further include an output unit wherein, if the MAC address information of the connecting device is registered, the output unit outputs a connecting device registration completion display.

The first signal may include at least one of the manufacturer information of the connecting device, personal information number (PIN) information and MAC address information of the connecting device.

If the first signal includes the manufacturer information and the MAC address information, the controller may determine: whether the connecting device is already registered by determining whether the manufacturer information of the connecting device includes information of the specific manufacturer, whether the first signal comprises PIN information, and whether the MAC address information of the connecting device corresponds to the stored MAC address information stored in the storage unit.

If it is determined that the connecting device is already registered, the controller may add success information to a second signal, and the controller may transmit the second signal to the connecting device and controls the communication unit to establish the wireless communication connection to the host device using the PIN information.

If another connecting device which is not registered at the access point is connected to the host device and transmits a response signal in response to a second beacon message of the access point, the controller may control the communication unit to transmit a wireless connection failure signal to the other connecting device.

The connecting device may be a USB dongle.

According to an aspect of another exemplary embodiment, there is provided a method for operating a connecting device which is connectable to a host device and connectable to an access point, the method including: if the connecting device is connected to the access point, providing information of the connecting device to the access point; if a beacon message is received from the access point and the connecting device has been disconnected from the access point and connected to the host device, transmitting a first signal to the access point; and if the access point identifies a registration state of the connecting device and transmits a wireless connection success signal, receiving the wireless connection success signal and establishing a wireless communication connecting between the access point and the host device via the connecting device According to an aspect of another exemplary embodiment, there is provided a system for establishing a wireless connection link between an access point and a host device, the system including: the access point having a connecting unit and a controller, wherein if the connecting device is mounted in the connecting unit of the access point the controller registers the connecting device in the access point, if the connecting device is dismounted from the access point, the access point broadcasts a wireless beacon, and wherein if the access point receives a wireless probe request signal from the connecting device, the controller determines whether the connecting device is registered in the access point, and if the connecting device is registered in the access point, the access point transmits a wireless probe response signal to the connecting device, and the connecting device which is mountable in the connecting unit of the access point and mountable in the host device, wherein if the connecting device receives the wireless beacon from the access point, the connecting device transmits the wireless probe request signal to the access point, and wherein if the connecting device receives the wireless probe response signal from the access point, the connecting device establishes the wireless communication link between the access point and the host.

The controller may register the connecting device in the access point by storing the media access control (MAC) address of the connecting device.

The controller may determine whether the connecting device is registered in the access point by comparing the media access control (MAC) address of the connecting device to MAC addresses stored in the access point.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
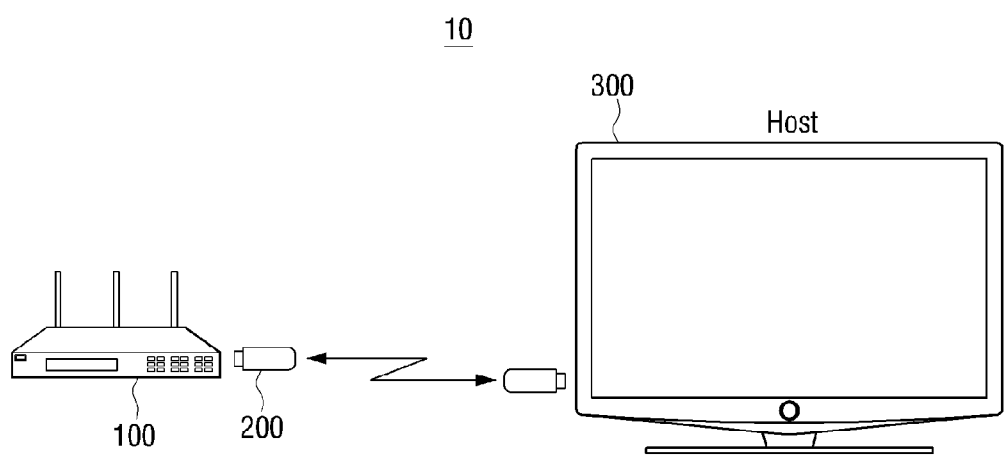
FIG. 1 is a view illustrating a wireless communication connecting system for connecting wireless communication between an access point (AP) and a connecting device according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a wireless communication connecting system 10 for connecting wireless communication between an access point (AP) 100 and a host device 300. As shown in FIG. 1, the wireless communication connecting system 10 comprises the AP 100, a connecting device 200, and the host device 300. The host device 300 may be a smart television (TV), a smart phone, a personal computer (PC), and a tablet PC.

The AP 100 provides wireless communication to the host device 300 via the connecting device 200. The connecting device 200 is a connecting device of a dongle type including media access control (MAC) address information.

More specifically, if the connecting device 200 is connected to the AP 100, the AP 100 identifies information of the connecting device 200 and registers the MAC address information of the connecting device 200.

If the connecting device 200 is disconnected from the AP 100 after the MAC address has been registered at the AP 100, the AP 100 broadcasts a beacon message at regular intervals. The beacon message comprises manufacturer information of the AP 100.

If the connecting device 200 is connected to the host device 300, the connecting device 200 identifies the manufacturer information included in the beacon message and transmits a probe request signal in response to the beacon message. The probe request signal comprises at least one of manufacturer information, personal identification number (PIN) information, and MAC address information of the connecting device 200.

If the AP 100 receives the probe request signal from the connecting device 200, the AP 100 determines whether to perform wireless communication connection with the connecting device 200 using the manufacturer information, the PIN information, and the MAC address information included in the probe request signal. More specifically, the AP 100 determines whether to perform the wireless communication connection with the connecting device 200 by determining whether the probe request signal includes information of a specific manufacturer, whether the probe request signal includes PIN information, and whether the MAC address is an already registered MAC address.

If the connecting device 200 includes the information of the specific manufacturer, if the connecting device 200 includes the PIN information, and if the MAC address of the connecting device 20 is the already registered MAC address, the AP 100 transmits a probe response signal comprising a wireless communication connection success message to the connecting device 200. The AP 100 performs the wireless communication connection with the connecting device 200 using the PIN information and provides the wireless communication connection to the host device 300.

However, if the connecting device 200 does not comprise the information of the specific manufacturer, if the connecting device 200 does not comprise the PIN information, or if the MAC address of the connecting device 200 is not the already registered MAC address, the AP 100 transmits a probe response signal comprising a wireless communication connection failure message to the connecting device 200.

As described above, if the wireless communication connection is performed between the AP 100 and the host device 300 using the connecting device 200, the user can achieve the wireless connection more intuitively. Also, since the PIN information is used, it is possible to guarantee security during the wireless connecting process and achieve wireless communication connection simply by connecting the connecting device 200 without a separate USB memory. Also, a priority can be given to wireless connection between products of a specific manufacturer using manufacturer information.

Figure 2:
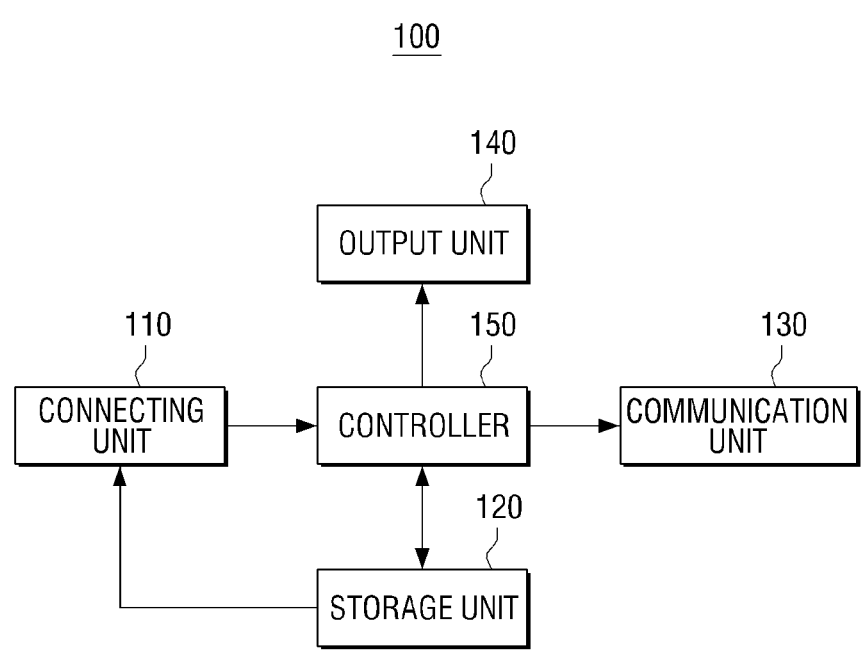
FIG. 2 is a block diagram illustrating an access point according to an exemplary embodiment.

Hereinafter, the AP 100 will be explained in detail with reference to FIG. 2. FIG. 2 is a block diagram illustrating the AP 100 according to an exemplary embodiment. As sown in FIG. 2, the AP 100 comprises a connecting unit 110, a storage unit 120, a communication unit 130, an output unit 140, and a controller 150.

The connecting unit 110 is connected to the connecting device 200 to receive information of the connecting device 200. More specifically, if the connecting device 200 is mounted in the connecting unit 110, the connecting unit 110 receives driver information and MAC address information of the connecting device 200.

The connecting unit 110 may be realized by a universal serial bus (USB) interface connecting unit.

The storage unit 120 stores diverse information and data for wireless communication of the AP 100. In particular, if the connecting device 200 is mounted in the AP 100, the storage unit 120 stores the MAC address information of the connecting device 200 under the control of the controller 150.

The storage unit 120 may be realized by a flash memory or a hard disk.

The communication unit 130 communicates with the connecting device 200 wirelessly. More specifically, the communication unit 130 transmits a beacon message in a broadcasting method. The beacon message comprises manufacturer information of the AP 100. If a probe request signal is received from the connecting device 200 in response to the beacon message, the communication unit 130 transmits a probe response signal comprising information regarding whether wireless communication connection is performed or not.

If the probe response signal comprises a wireless communication connection success message of the AP 100 and the connecting device 200, the communication unit 130 performs wireless communication connection with the connecting device 200 using PIN information. More specifically, if the communication unit 130 receives an authentication request signal and an association request signal from the connecting device 200, the communication unit 130 transmits an authentication response signal and an association response signal in response to them. Also, if the AP 100 identifies that it is possible to connect wireless communication with the connecting device 200, the communication unit 130 transmits an extensible authentication protocol (EAP) identify signal comprising wireless communication connection data to the connecting device 200. The wireless communication connection data comprises a service set identifier (SSID) and PIN information to connect the AP 100 and the connecting device 200. Also, if the communication unit 130 receives an EAP identify response signal from the connecting device 200, the communication unit 130 transmits an EAP start signal requesting a start of a WPS to the connecting device 200.

If the connecting device 200 successfully registers the MAC address at the AP 100, the output unit 140 outputs a connecting device registration completion display. For example, the output unit 140 may make an external light emitting diode (LED) flicker or may output a specific signal sound.

Also, if the wireless communication between the AP 100 and the connecting device 200 is successfully achieved, the output unit 140 may output a specific signal.

The controller 150 controls an overall operation of the access point 100. In particular, the controller 140 identifies information of the connecting device 200 and registers MAC address of the connecting device 200. More specifically, if the connecting device 200 is connected to the connecting unit 110, the controller 150 identifies manufacturer information of the connecting device 200. If the manufacturer information of the connecting device 200 comprises information of a specific manufacturer, the controller 150 stores the MAC address of the connecting device 200 in the storage unit 120.

If a probe request signal is received from the connecting device 200 as a response signal for responding to the beacon message after the connecting device 200 has been disconnected from the connecting unit 110 and connected to the host device 300, the controller 150 determines whether the connecting device 200 is a connecting device stored in the storage unit 120 using the probe request signal and performs wireless communication connection with respect to the host device 300.

More specifically, the controller 150 determines whether the connecting device 200 is an already registered connecting device by determining whether the manufacturer information of the connecting device 200 included in the probe request signal comprises information of a specific manufacturer, whether the probe request signal comprises PIN information, and whether the MAC address information included in the probe request signal is identical to the registered MAC address information.

If it is determined that the connecting device 200 is the already registered connecting device, the controller 150 adds information indicating that the wireless communication connection has succeeded to a probe response signal, which is a response signal for responding to the probe request signal, transmits the probe response signal to the connecting device 200, and performs the wireless communication connection using the PIN information included in the probe request signal.

However, if it is determined that the connecting device 200 is not the already registered connecting device, the controller 150 controls the communication unit 130 to transmit a wireless connection failure signal to the connecting device 200.

Hereinafter, a method for connecting wireless communication between the AP 100 and the connecting device 200 will be explained with reference to FIGS. 3 to 6.

Figure 3:
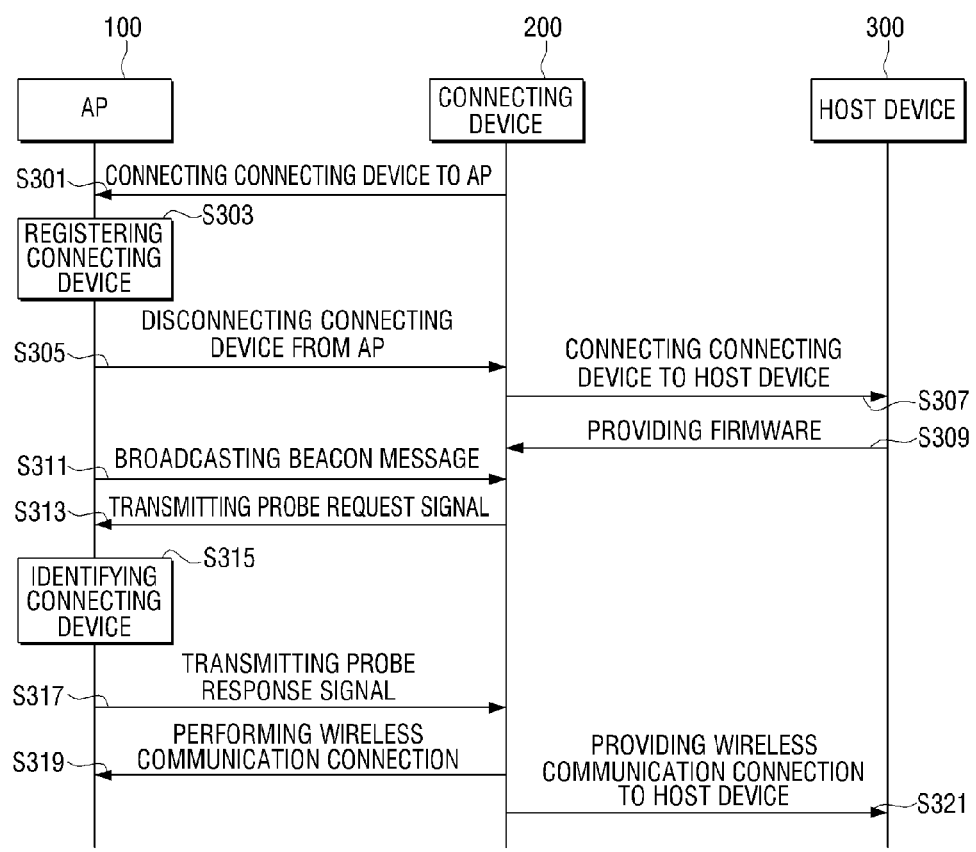
FIG. 3 is a flowchart illustrating a method for connecting wireless communication of a wireless communication connecting system according to an exemplary embodiment.

FIG. 3 is a flowchart illustrating a method for connecting wireless communication of the wireless communication connecting system 10 according to an exemplary embodiment.

First, the connecting device 200 is connected to the AP (S301). More specifically, the connecting device 200 is of a dongle type and is connected to an USB interface connecting unit of the AP 100.

Figure 4:
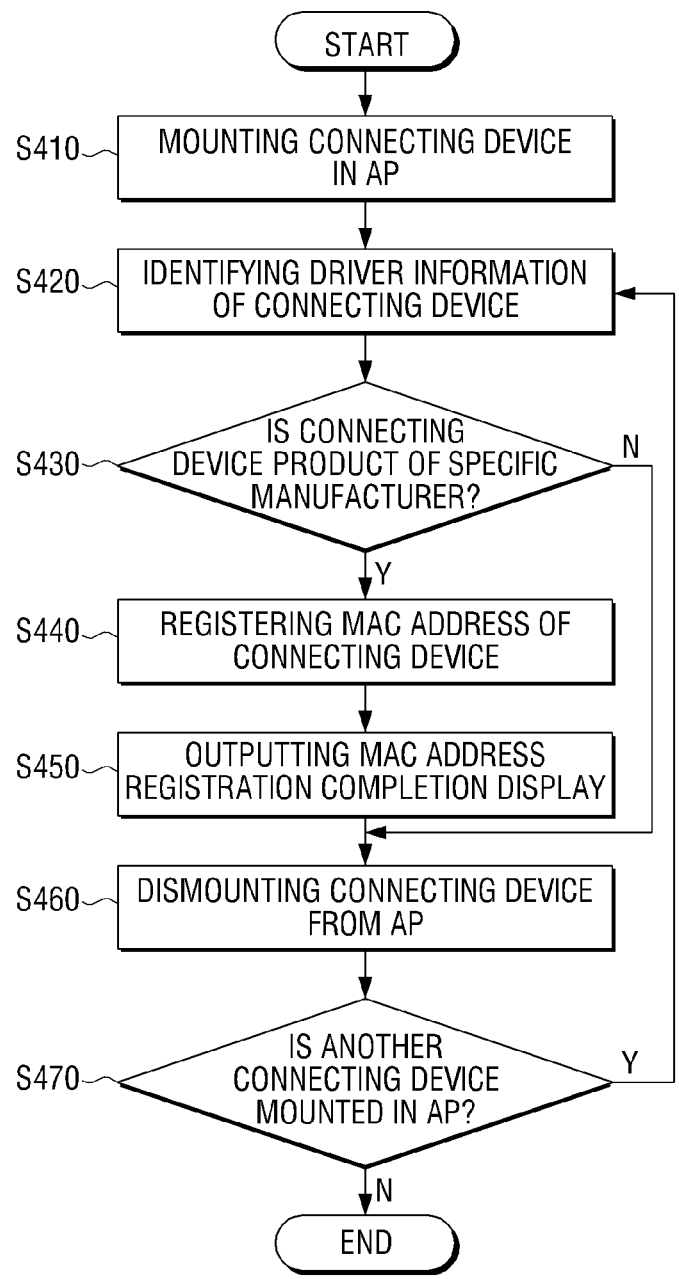
FIG. 4 is a flowchart illustrating a process of registering a connecting device at an AP according to an exemplary embodiment.

If the connecting device 20 is connected to the AP 100, the AP 100 identifies information of the connecting device 200 and registers the connecting device 200. A process of registering the connecting device 200 is now explained with reference to FIG. 4. FIG. 4 is a flowchart illustrating a process of registering the connecting device 200 at the AP 100 according to an exemplary embodiment.

As shown in FIG. 4, if the connecting device 200 is mounted in the AP 100 (S410), the AP 100 identifies driver information of the connecting device 200 (S420).

Also, the AP 100 determines whether the connecting device 200 is a product of a specific manufacturer using the driver information (S430). If the connecting device 200 is the product of the specific manufacturer (S430-Y), the AP 100 registers MAC address information of the connecting device 200 (S440). The AP 100 outputs a MAC address registration completion display indicating that the MAC address has been normally registered (S450). The connecting device 200 is disconnected from the AP 100 (S640).

If the registration of one connecting device 200 has been completed, the AP 100 determines whether another connecting device 200 is mounted in the AP 100 (S470). If anther connecting device 200 is mounted in the AP 100, the AP 100 returns to operation S420 and performs the subsequent operations again.

If there are a plurality of connecting devices to be connected to the AP 100, the AP 100 may generate a MAC list in which a plurality of MAC addresses are stored.

Referring back to FIG. 3, once the connecting device 200 is registered at the AP 100, the connecting device 200 is disconnected from the AP 100 (S305). Then, the connecting device 200 is connected to the host device 300 (S307). If the connecting device 200 is connected to the host device 300, the host device 300 provides a firmware so that the connecting device 300 is operated (S309).

The AP 100 broadcasts a beacon message to the outside (S311). The beacon message comprises manufacturer information (vender ID) of the AP 100.

If the connecting device 200 receives the beacon message, the connecting device 200 identifies the manufacture information of the AP 100 included in the beacon message and transmits a probe request signal in response to the beacon message (S313). The probe request signal comprises manufacturer information, PIN information, and MAC address information of the connecting device 200.

If the AP 100 receives the probe request signal, the AP 100 identifies the connecting device 200 using the manufacture information, the PIN information, and the MAC address information included in the probe request signal (S315). More specifically, the AP 100 determines whether the connecting device 200 is an already registered connecting device by determining whether the probe request signal comprises information of a specific manufacturer, whether the probe request signal comprises PIN information, and whether the MAC address information is already registered MAC address information.

After identifying whether the connecting device 200 is the already registered connecting device or not, the AP 100 transmits a probe response signal to the connecting device 200 (S317). The probe response signal comprises information regarding whether wireless communication connection with the connecting device has succeeded. More specifically, if it is determined that the connecting device 200 is the already registered connecting device, the AP 100 transmits a probe response signal comprising wireless communication connection success information to the connecting device 200. However, if it is determined that the connecting device 200 is not the already registered connecting device, the AP 100 transmits a probe response signal comprising wireless communication connection failure information.

If the connecting device 200 receives the probe response signal comprising a wireless communication connection success message, the connecting device 200 performs wireless communication connection using the PIN information the connecting device 200 has transmitted previously (S319). The method for connecting wireless communication using the PIN information has been described above with reference to FIG. 2 and thus a detailed description thereof is omitted.

If the wireless communication connection is performed between the connecting device 200 and the AP 100, the connecting device 200 provides the wireless communication connection to the host device 300 (S321).

Using the above-described wireless communication connecting method, the user can achieve the wireless connection more intuitively. Also, since the PIN information is used, it is possible to guarantee security during the wireless connecting process and achieve the wireless communication connection simply by mounting the connecting device 200 without a separate USB memory. Also, a priority can be given to wireless connection between products of a specific manufacturer using manufacturer information.

Figure 5:
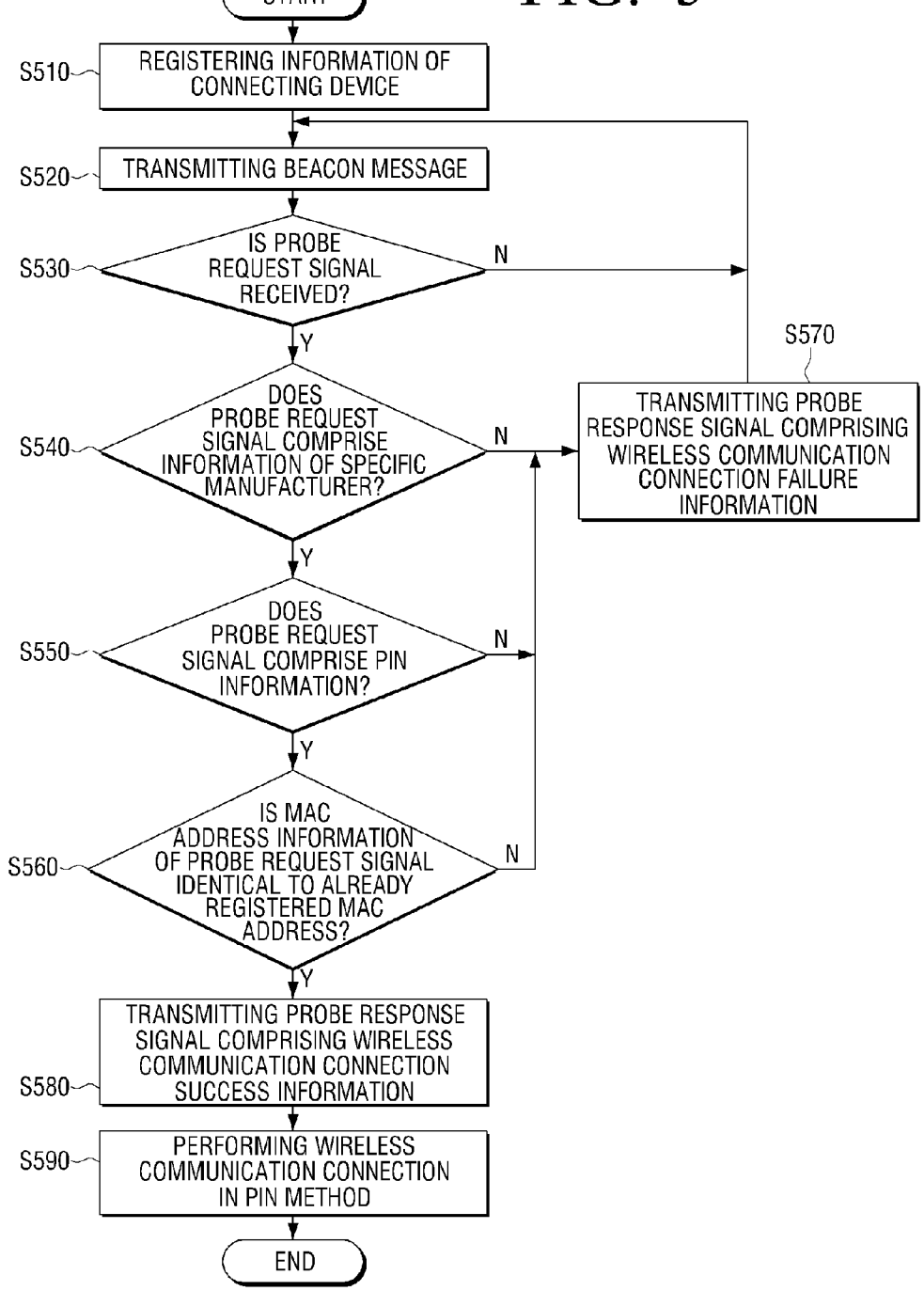
FIG. 5 is a flowchart illustrating a method for connecting wireless communication of an AP according to an exemplary embodiment.

FIG. 5 is a flowchart illustrating a method for connecting wireless communication of the AP according to an exemplary embodiment.

If the connecting device 200 is mounted in the AP 100, the AP registers information of the connecting device 200 as described above with reference to FIG. 4 (S510). The information of the connecting device refers to MAC address information of the connecting device 200.

Also, the AP 100 transmits a beacon message (S520). The beacon message comprises manufacturer information of the AP 100 and is transmitted in a broadcasting method at regular intervals.

If the connecting device 200 receives the beacon message, the AP 100 receives a probe request signal from the connecting device 200 in response to the beacon message (S530). The probe request signal comprises manufacturer information, PIN information, and MAC address information of the connecting device 200.

If the probe request signal is received (S530-Y), the AP 100 determines whether the probe request signal comprises information of a specific manufacturer (S540). For example, if the manufacturer of the AP 100 is Samsung Electronics Co., Ltd., it is determined whether the probe request signal comprises manufacturer information 'Samsung Electronics Co., Ltd.

If the probe request signal comprises the information of the specific manufacturer (S540-Y), the AP determines whether the probe request signal comprises PIN information (S550).

If the probe request signal comprises the PIN information (S550-Y), the AP 100 determines whether the MAC address included in the probe request signal is an already registered address (S560).

If the MAC address included in the probe request signal is the already registered address, the AP transmits a probe response signal comprising wireless communication connection success information to the connecting device 200 (S580).

The AP 100 performs wireless communication connection in a PIN method (S580). More specifically, if the AP 100 transmits the probe response signal to the connecting device 200, the AP 100 receives an authentication request signal and an association request signal from the connecting device 200. Also, the AP transmits an authentication response signal and an association response signal in response to the authentication request signal and the association request signal.

If the AP 100 identifies that it is possible to connect wireless communication with the connecting device 200, the AP 100 transmits an EAP identify signal comprising wireless communication connection data to the connecting device 200. The wireless communication connection data comprises SSID and PIN information for connecting the AP 100 and the connecting device 200. Also, if the communication unit 130 receives an EAP Identify response signal from the connecting device 200, the communication unit 130 transmits an EAP start signal requesting a start of a WPS to the connecting device 200. Through the above-describe process, the AP 100 starts the wireless communication connection with the connecting device 200.

However, if the probe request signal does not comprise the information of the specific manufacturer (S540-N), if the probe request signal does not comprise the PIN information (S550-N), or if the MAC address information included in the probe request signal is not the already registered MAC address (S560-N), the AP 100 transmits a probe response signal comprising wireless communication connection failure information to the connecting device 200 (S570).

If the wireless communication connection between the connecting device 200 and the AP 100 is successfully performed, the AP 100 automatically stores the information of the connecting device 200 and automatically performs connection using the information of the connecting device 200 when the AP 100 tries to re-connect the connecting device 200 afterward.

Figure 6:
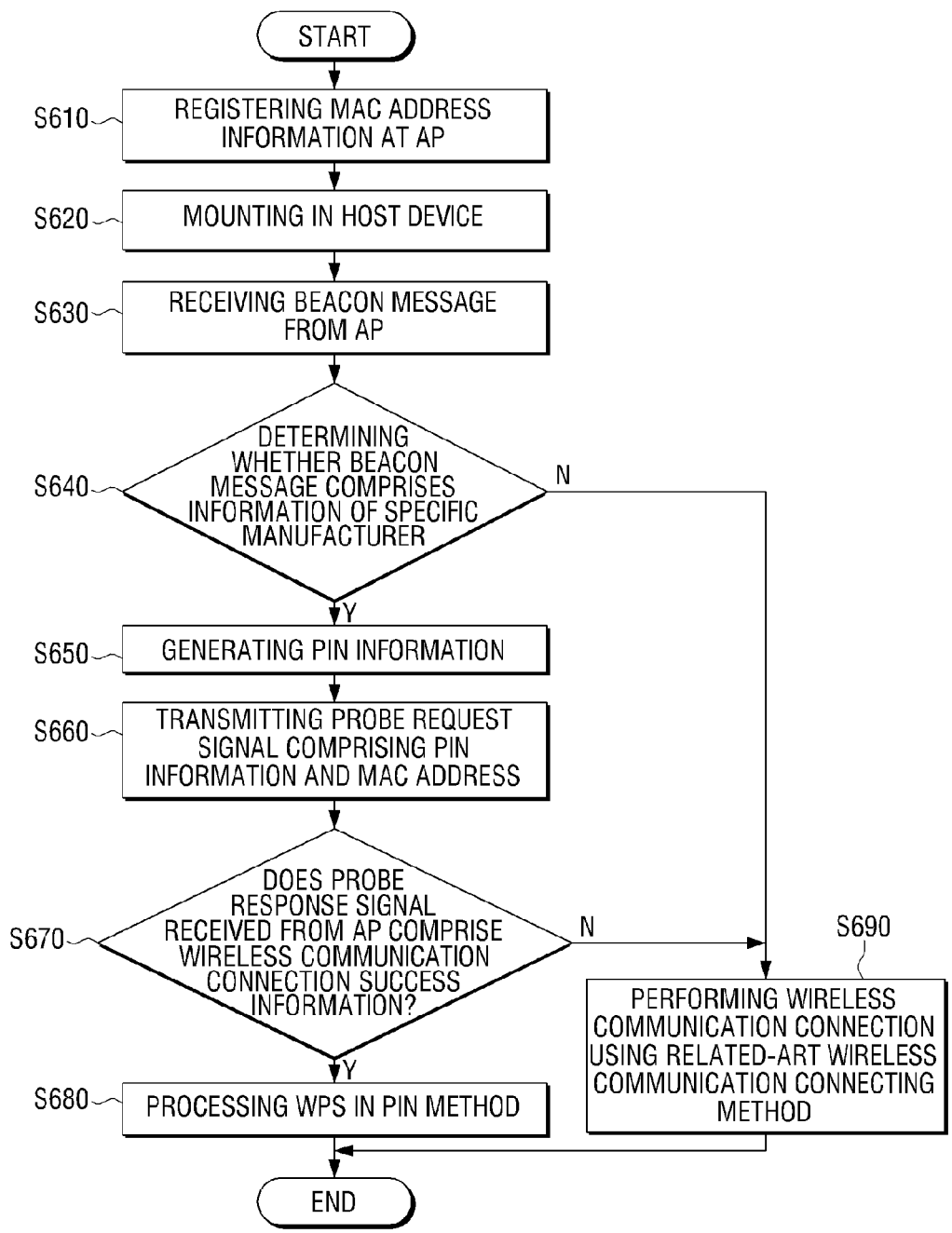
FIG. 6 is a flowchart illustrating a method for connecting wireless communication of a connecting device according to an exemplary embodiment.

FIG. 6 is a flowchart illustrating a method for connecting wireless communication of the connecting device 200 according to an exemplary embodiment.

If the connecting device 200 is mounted in the AP 100, the connecting device 200 goes through the process of FIG. 4, thereby registering its own MAC address information at the AP 100 (S610). Then, the connecting device 200 is dismounted from the AP 100 and mounted in the host device 300 (S620).

The connecting device 200 receives a beacon message from the AP 100 (S630). The beacon message comprises manufacturer information of the AP 100.

If the beacon message is received, the connecting device 200 determines whether the beacon message comprises information of a specific manufacturer (S640).

If the beacon message comprises the information of the specific manufacturer (S640-Y), the connecting device 200 generates PIN information (S650). The PIN information may be an 8-digit password which is randomly generated.

The connecting device 200 transmits a probe request signal comprising the PIN information and a MAC address to the AP 100 (S660).

However, if the beacon message does not comprise the information of the specific manufacturer (S640-N), the connecting device 200 performs wireless communication connection using a related-art wireless communication connecting method (S690).

If a probe response signal is received from the AP 100, the connecting device 200 determines whether the probe response signal received from the AP 100 comprises wireless communication connection success information or not (S670). If the probe response signal comprises the wireless communication connection success information (S670-Y), the connecting device 200 processes a WPS in a PIN method (S680).

However, if the probe response signal comprises failure information rather than the wireless communication connection success information (S670-N), the connecting device 200 performs wireless communication connection using the related-art wireless communication connecting method (S690).

By means of the operations of the AP 100 and the connecting device 200 as described above with reference to FIGS. 5 and 6, the user can perform wireless connection more intuitively. Also, since the PIN information is used, it is possible to guarantee security during the wireless connecting process and achieve the wireless communication connection simply by connecting the connecting device without a separate USB memory. Also, a priority may be given to wireless connection between products of a specific manufacturer using manufacture information.

In the above embodiment, the connecting device 200 is always operated if the connecting device 200 is mounted in the host device 300. However, this is merely an example. The connecting device 200 may be operated only if the host device 300 is in a specific mode (for example, an easy wireless connection mode) and perform wireless communication connection in a related-art method if the host device 300 is not in the specific mode.

In the above embodiment, the AP 100 is a separate device. However, this is merely an example. The present disclosure can be applied to any device that can perform the function of the AP 100. For example, the AP 100 may be a television or a personal computer.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of operating an access point, which is connectable to a host device via a wireless communication connection, and further connectable to a connecting device, the method comprising:
   if the connecting device is physically connected to the access point, registering information of the connecting device by the access point;
   if the connecting device transmits a first signal in response to a first beacon message of the access point after having been disconnected from the access point and physically connected to the host device, receiving the first signal by the access point;
   determining whether the connecting device is already registered using the first signal; and
   if it is determined that the connecting device is already registered, connecting to the host device via the wireless communication connection.

2. The method as claimed in claim 1, wherein the registering information of the connecting device by the access point comprises:
   if the connecting device is connected to the access point, identifying manufacturer information of the connecting device and determining whether the connecting device is of a specific manufacturer; and
   if the connecting device is of the specific manufacturer, registering media access control (MAC) address information of the connecting device.

3. The method as claimed in claim 2, wherein the registering information of the connecting device by the access point further comprises, if the MAC address information of the connecting device is registered, outputting a connecting device registration completion display.

4. The method as claimed in claim 1, wherein the first signal comprises at least one of manufacturer information of the connecting device, personal information number (PIN) information and media access control (MAC) address information of the connecting device.

5. The method as claimed in claim 4, wherein if the first signal comprises the manufacturer information, the PIN information and the MAC address information, the determining whether the connecting device is already registered comprises:
   determining whether the manufacture information of the connecting device comprises information of a specific manufacturer,
   determining whether the first signal comprises the PIN information, and
   determining whether the MAC address information of the connecting device corresponds to the registered MAC address information.

6. The method as claimed in claim 5, wherein the connecting to the host device via the wireless communication connection comprises:
   if it is determined that the connecting device is already registered, adding success information, wherein the success information indicates that the wireless communication connection has succeeded, to a second signal, and wherein the second signal is a response signal for the first signal, and transmitting the second signal to the connecting device; and
   establishing the wireless communication connection using the PIN information.

7. The method as claimed in claim 1, further comprising, if another connecting device which is not registered at the access point is connected to the host device and transmits a response signal in response to a second beacon message of the access point, transmitting a wireless connection failure signal to the other connecting device.

8. The method as claimed in claim 1, wherein the connecting device is a Universal Serial Bus (USB) dongle.

9. An access point comprising:
   a connecting unit which is connectable to a connecting device;
   a storage unit which registers information of the connecting device, if the connecting device is physically connected to the connecting unit;
   a communication unit which broadcasts a first beacon message; and
   a controller wherein, if a first signal is received from the connecting device in response to the broadcast first beacon message after the connecting device has been disconnected from the access point and physically connected to a host device, the controller determines whether the connecting device is already registered at the storage unit according to the first signal, and connects to the host device via a wireless communication connection.

10. The access point as claimed in claim 9, wherein, if the connecting device is connected to the access point, the controller identifies manufacturer information of the connecting device and determines whether the connecting device is of a specific manufacturer, and, if the connecting device is of the specific manufacturer, the controller stores Media Access Control (MAC) address information of the connecting device in the storage unit.

11. The access point as claimed in claim 10, further comprising an output unit wherein, if the MAC address information of the connecting device is registered, the output unit outputs a connecting device registration completion display.

12. The access point as claimed in claim 10, wherein the first signal comprises at least one of the manufacturer information of the connecting device, personal information number (PIN) information and MAC address information of the connecting device.

13. The access point as claimed in claim 12, wherein if the first signal includes the manufacturer information and the MAC address information, the controller determines:
   whether the connecting device is already registered by determining whether the manufacturer information of the connecting device comprises information of the specific manufacturer,
   whether the first signal comprises PIN information, and
   whether the MAC address information of the connecting device corresponds to the stored MAC address information stored in the storage unit.

14. The access point as claimed in claim 13, wherein, if it is determined that the connecting device is already registered, the controller adds success information to a second signal, and the controller transmits the second signal to the connecting device and controls the communication unit to establish the wireless communication connection to the host device using the PIN information.

15. The access point as claimed in claim 9, wherein, if another connecting device which is not registered at the access point is connected to the host device and transmits a response signal in response to a second beacon message of the access point, the controller controls the communication unit to transmit a wireless connection failure signal to the other connecting device.

16. The access point as claimed in claim 9, wherein the connecting device is a USB dongle.

17. A method for operating a connecting device which is connectable to a host device and connectable to an access point, the method comprising:
- if the connecting device is physically connected to the access point, providing information of the connecting device to the access point;
- if a beacon message is received from the access point and the connecting device has been disconnected from the access point and physically connected to the host device, transmitting a first signal to the access point; and
- if the access point identifies a registration state of the connecting device and transmits a wireless connection success signal, receiving the wireless connection success signal and establishing a wireless communication connecting between the access point and the host device via the connecting device.

18. A system for establishing a wireless connection link between an access point and a host device, the system comprising:
- the access point having a connecting unit and a controller, wherein if the connecting device is physically mounted in the connecting unit of the access point the controller registers the connecting device in the access point, if the connecting device is dismounted from the access point, the access point broadcasts a wireless beacon, and wherein if the access point receives a wireless probe request signal from the connecting device, the controller determines whether the connecting device is registered in the access point, and if the connecting device is registered in the access point, the access point transmits a wireless probe response signal to the connecting device, and
- the connecting device which is mountable in the connecting unit of the access point and mountable in the host device, wherein if the connecting device receives the wireless beacon from the access point after having been physically mounted in the host device, the connecting device transmits the wireless probe request signal to the access point, and wherein if the connecting device receives the wireless probe response signal from the access point, the connecting device establishes the wireless communication link between the access point and the host device.

19. The system according to claim 18, wherein the controller registers the connecting device in the access point by storing the media access control (MAC) address of the connecting device.

20. The system according to claim 18, wherein the controller determines whether the connecting device is registered in the access point by comparing the media access control (MAC) address of the connecting device to MAC addresses stored in the access point.

* * * * *